Figure 1:
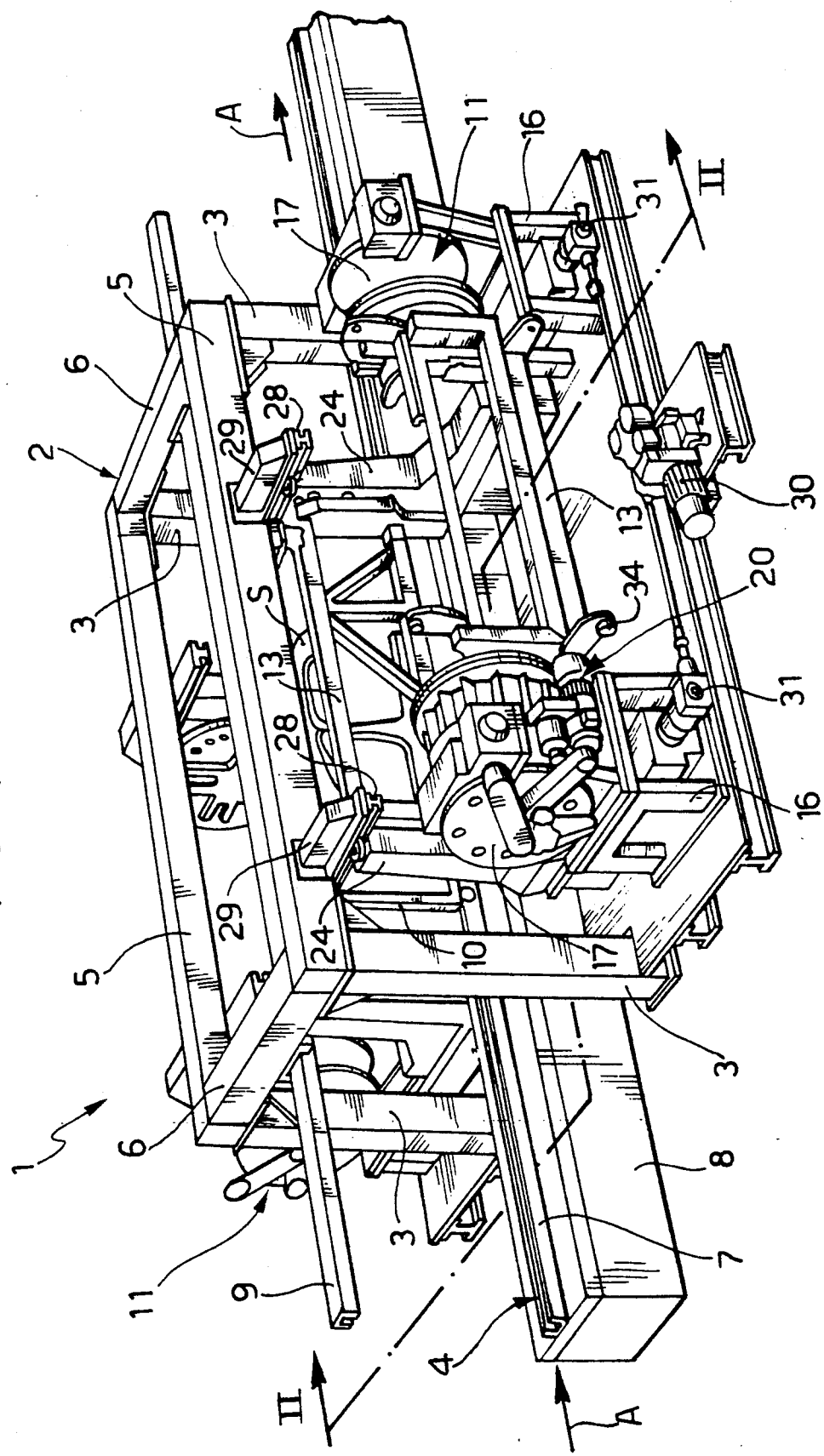

United States Patent [19]

Alborante

[11] Patent Number: 5,174,488

[45] Date of Patent: Dec. 29, 1992

[54] DEVICE FOR WELDING STRUCTURES, SUCH AS MOTOR-VEHICLE BODIES OR PARTS THEREOF, CONSTITUTED BY LOOSELY PREASSEMBLED, PRESSED SHEET-METAL ELEMENTS

[75] Inventor: Giancarlo Alborante, Trofarello, Italy

[73] Assignee: Comau Spa, Torino, Italy

[21] Appl. No.: 908,063

[22] Filed: Jul. 6, 1992

[30] Foreign Application Priority Data

Aug. 7, 1991 [IT] Italy ............................ T091A000633

[51] Int. Cl.$^5$ ............................................. B23K 37/04
[52] U.S. Cl. .................................. 228/4.1; 228/47 A
[58] Field of Search ....................... 228/4.1, 5.1, 44.3, 228/47, 47 A, 49.1; 219/79, 80, 86.24, 158; 29/150, 795

[56] References Cited

U.S. PATENT DOCUMENTS

| | | | |
|---|---|---|---|
| 4,404,451 | 9/1983 | Niikawa et al. | 228/47 A |
| 4,905,884 | 3/1990 | Alborante et al. | 228/4.1 |
| 4,972,987 | 11/1990 | Di Rosa | 228/4.1 |

Primary Examiner—Samuel M. Heinrich
Attorney, Agent, or Firm—Armstrong & Kubovcik

[57] ABSTRACT

In a device for welding structures, such as motor-vehicle bodies or parts thereof (for example, sides), constituted by loosely preassembled, pressed sheet-metal elements, a station for welding the elements includes two rotary drums for rapidly changing the frames for positioning the elements to be welded in the operative position, according to the type of structure to be welded. The various positioning frames are rotated by rotors and guided on annular tracks on each rotary drum. A sector of each annular track can be separted and moved along a line transverse the conveyor line for the structures to be welded in order to bring a certain positioning frame into the operative position.

5 Claims, 6 Drawing Sheets

DEVICE FOR WELDING STRUCTURES, SUCH AS MOTOR-VEHICLE BODIES OR PARTS THEREOF, CONSTITUTED BY LOOSELY PREASSEMBLED, PRESSED SHEET-METAL ELEMENTS

The present invention relates to a device for welding structures, such as motor-vehicle bodies or parts thereof, constituted by loosely preassembled, pressed sheet-metal elements, the device including:

a station for positioning and welding the components of the structure, a conveyor line for transporting the loosely preassembled structures to the station, at least two pairs of positioning frames disposed in the station on either side of the conveyor line, each pair of positioning frames having locating devices which can engage the structure to be welded and are suitable for the specific geometric shape of a structure of a particular type, welding means in the station for welding the components of the structure after they have been positioned correctly by the respective pair of positioning frames, means for transporting the positioning frames in order to bring the pair of positioning frames corresponding to the type of structure to be welded at the time in question into an operative position in the welding station, the transporting means including:

two rotary drums which are disposed in the station on either side of the conveyor line and are rotatable about respective axes parallel to the conveyor line, each drum being associated with the positioning frames on one side of the station, means for restraining respective positioning frames in fixed positions on each drum during its rotation, and means for completely removing one positioning frame from the respective rotary drum when the drum is stationary and for moving the frame transverse the conveyor line towards its operative position adjacent the structure to be welded and, in the opposite direction, from its operative position to return the positioning frame to the respective rotary drum.

A welding device of the type indicated above is the subject of the present Applicant's Italian patent 1,223,690, as well as of the corresponding European patent EP-A-0 351 377 and the corresponding patent US-A-4 905 884.

The object of the present invention is to improve the aforementioned known device by making the means for transporting the positioning frames particularly simple and effective.

The device according to the invention is characterised in that:

the means for restraining the respective positioning frames on each rotary drum include a pair of annular tracks disposed in two parallel planes perpendicular to the axis of rotation of the drum, the ends of each positioning frame are guided on the annular tracks, each rotary drum includes a motor-driven shaft connected to two rotors, each of which has means for entraining the positioning frames in rotation about the axis of the drum, guided on the two annular tracks, each annular track includes a fixed, main sector which is connected rigidly to a fixed support structure and an auxiliary sector which completes the ring of the track and is separate from the main sector on the side of the ring which faces the conveyor line, and the means for transporting the positioning frames include, for each side of the station, two auxiliary support structures to which the two auxiliary sectors of the annular tracks are connected and which are movable transverse the conveyor line.

In operation, when a structure of a type different from that previously welded, for example, a body of a motor vehicle of a different model, enters the welding station to be welded, the drum members are rotated in order to bring the two positioning frames corresponding to the type of body to be welded to the sides of the two drums which face each other and which face towards the central conveyor line which transports the bodies through the welding station. At this stage, the shafts of the drums rotate, correspondingly rotating the rotors which in turn cause the positioning frames to revolve about the axis of the drum, the ends of the frames being guided on the annular tracks. When the two positioning frames reach the sides of the drums which face the central region of the station, the rotation is stopped. At this point, the auxiliary support structures are moved transverse the conveyor line towards the central working region. As they move, the auxiliary support structures carry with them the auxiliary sectors of the annular tracks, which are connected rigidly to the auxiliary structures, and hence the positioning frames which are positioned on the auxiliary sectors. The positioning frames corresponding to the type of structure to be welded thus reach their operative positions in which the locating devices carried by the frame can engage the various components of the structure in order to position them correctly before they are welded. As envisaged in the present Applicant's patent cited above, the welding means may be constituted by programmable welding robots disposed in the welding station and/or by welding guns carried by the positioning frames.

Figure 2:
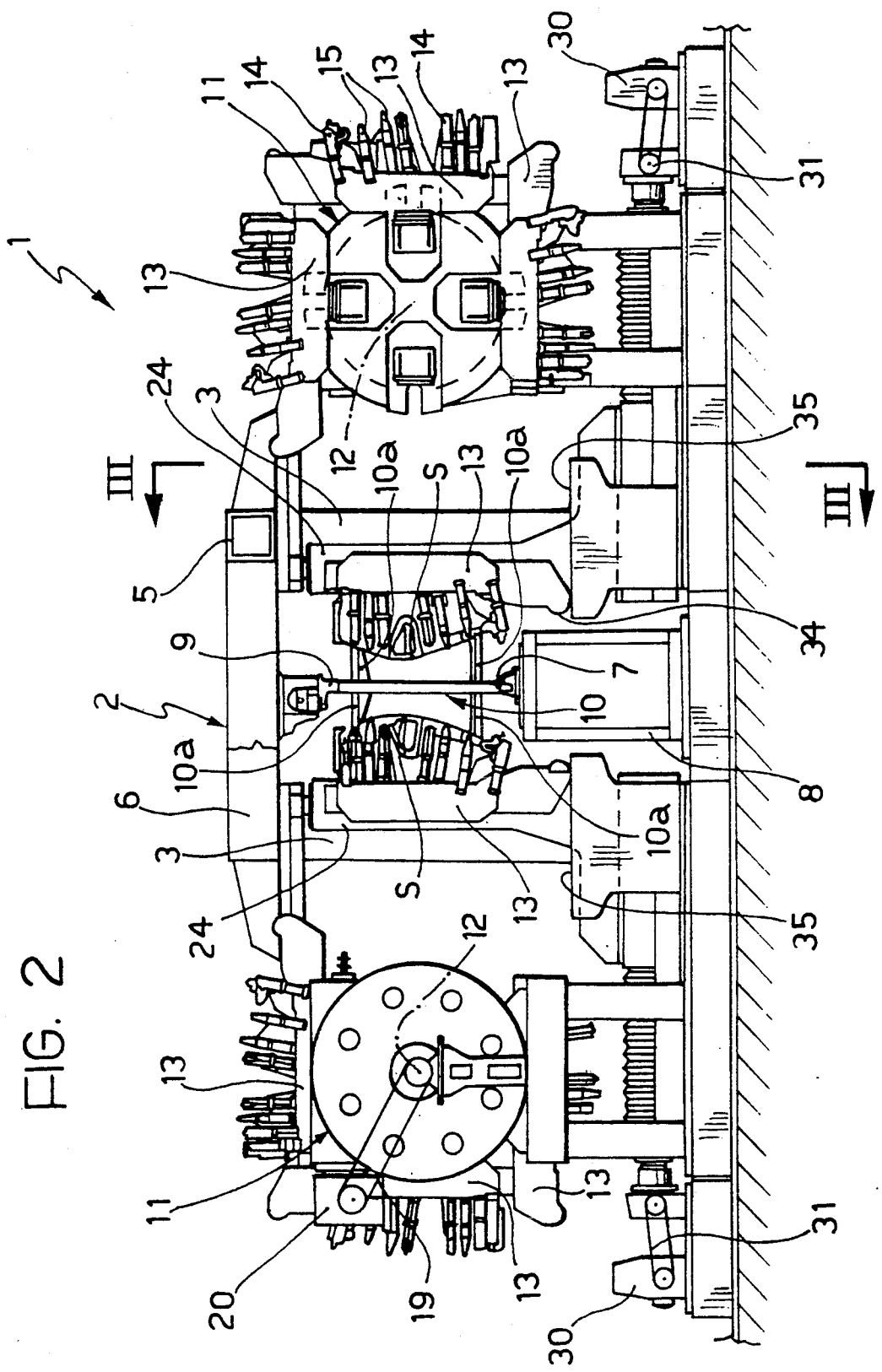
Figure 3:
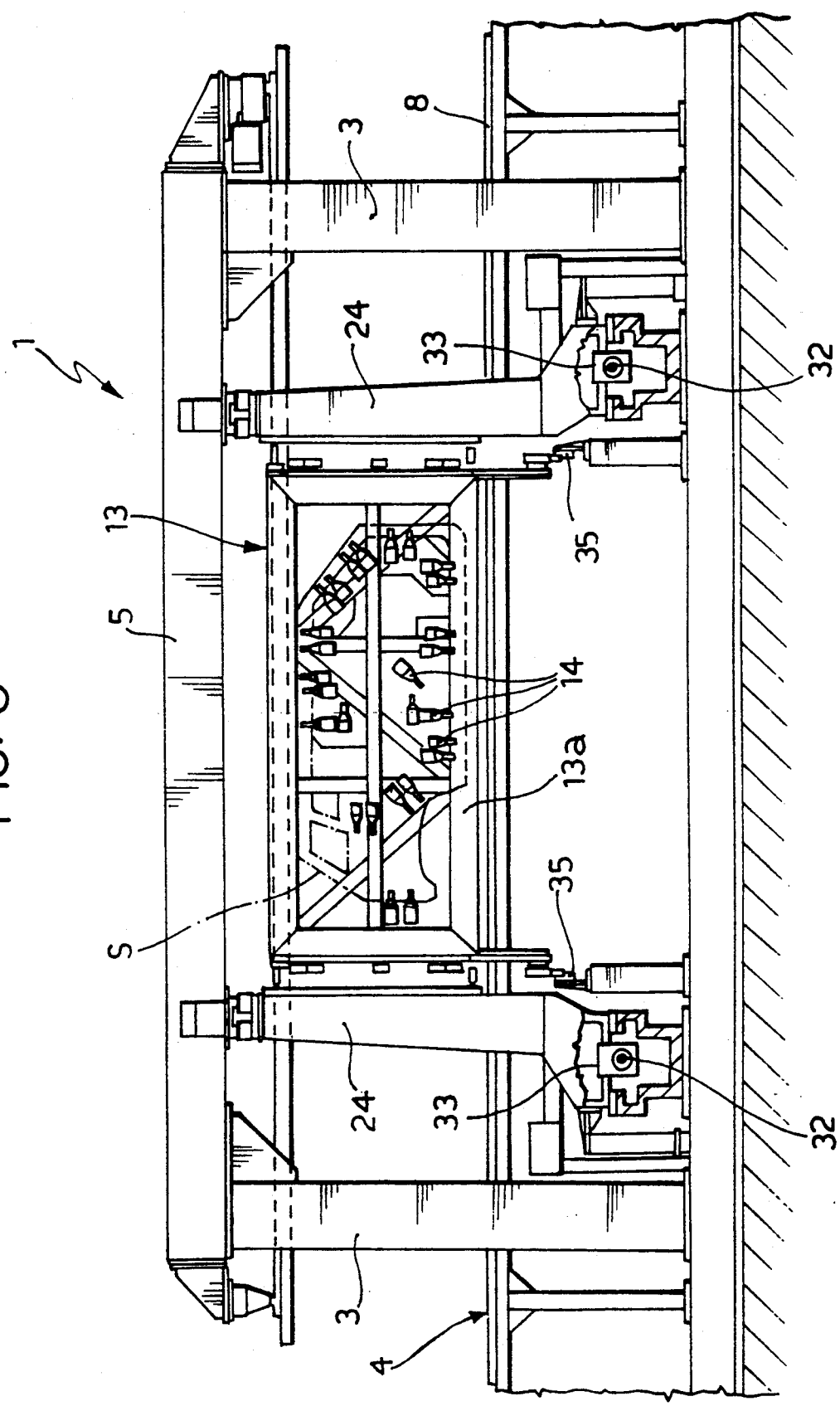
Figure 4:
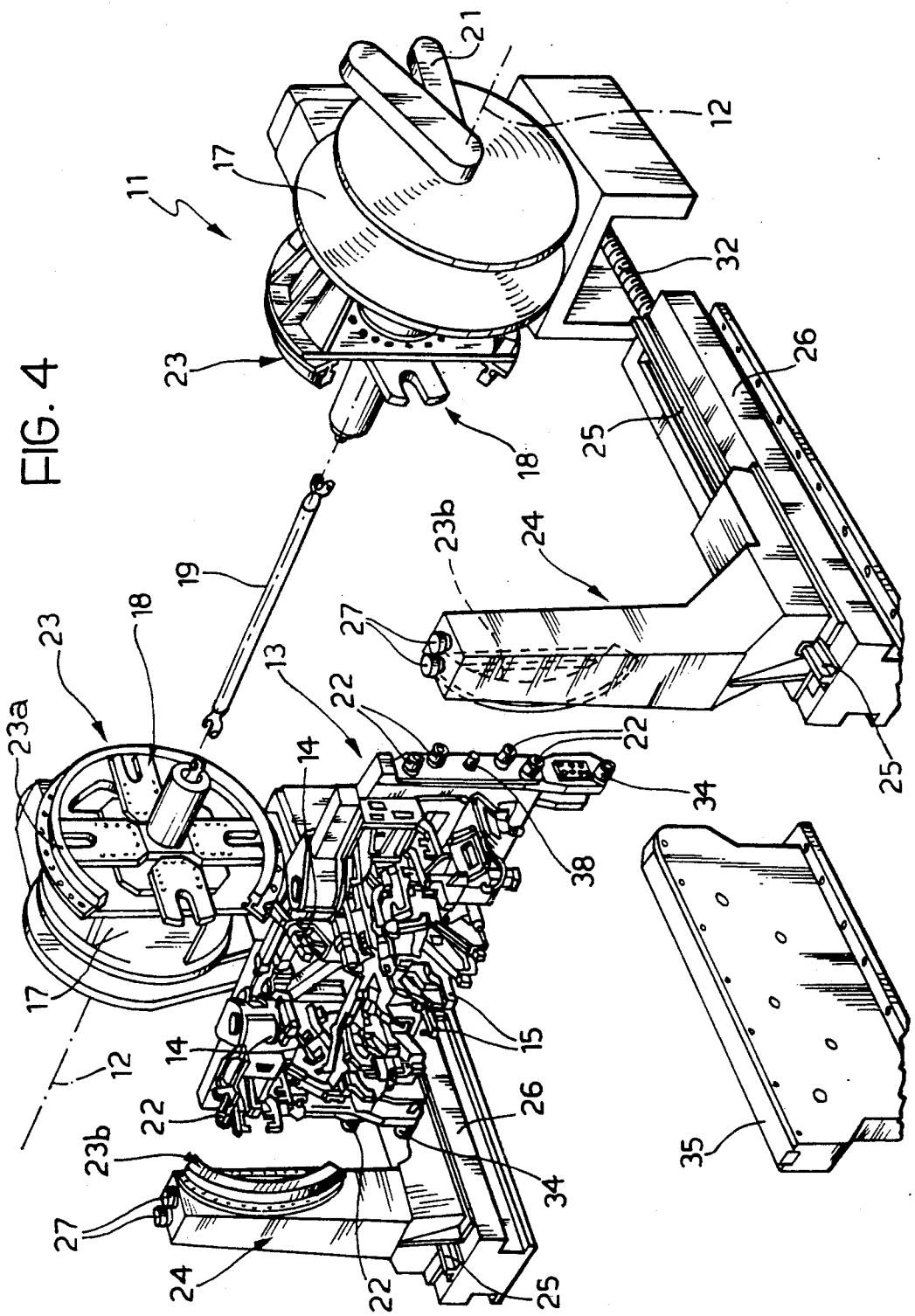
Figure 5:
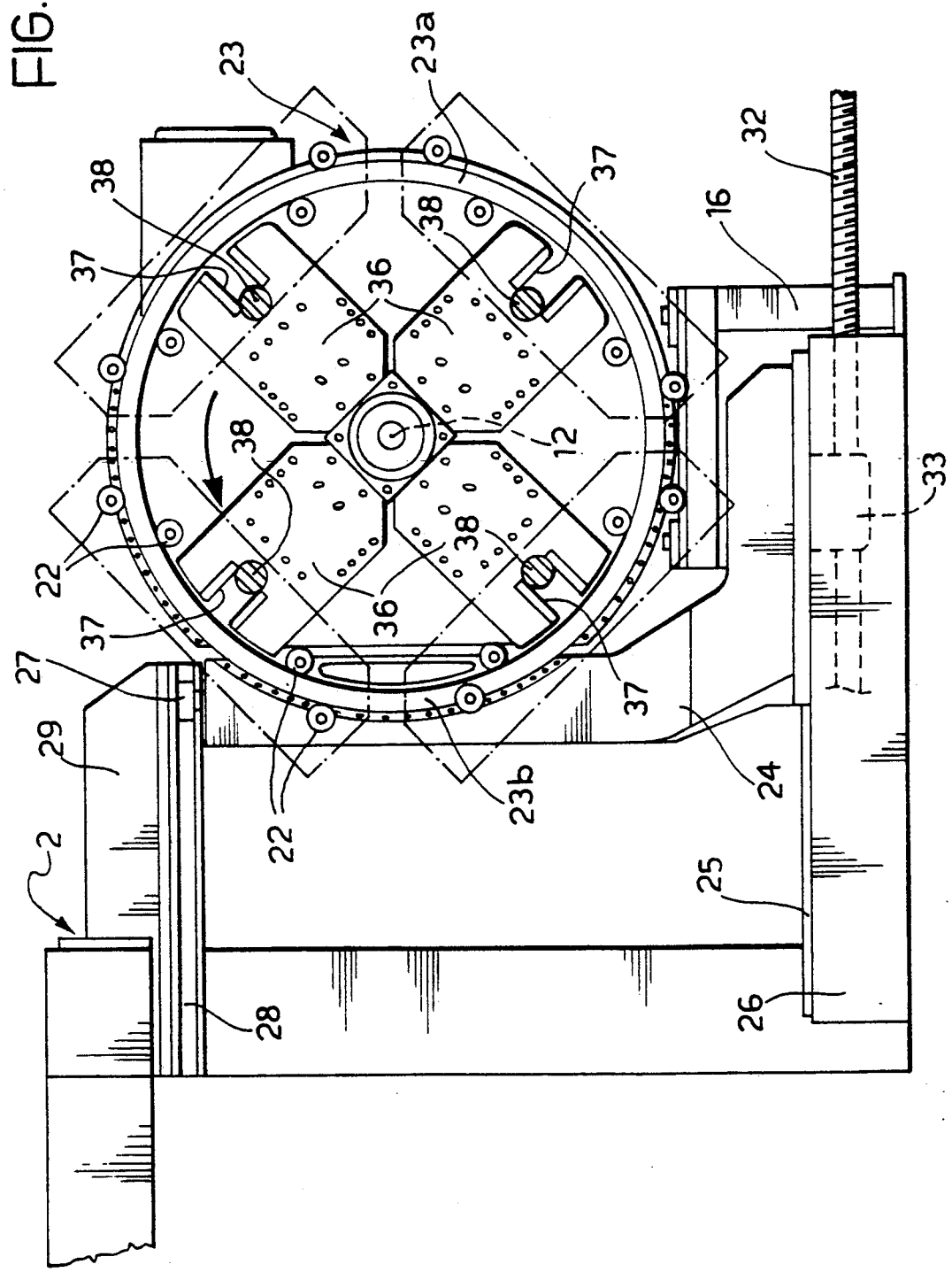
Figure 6:
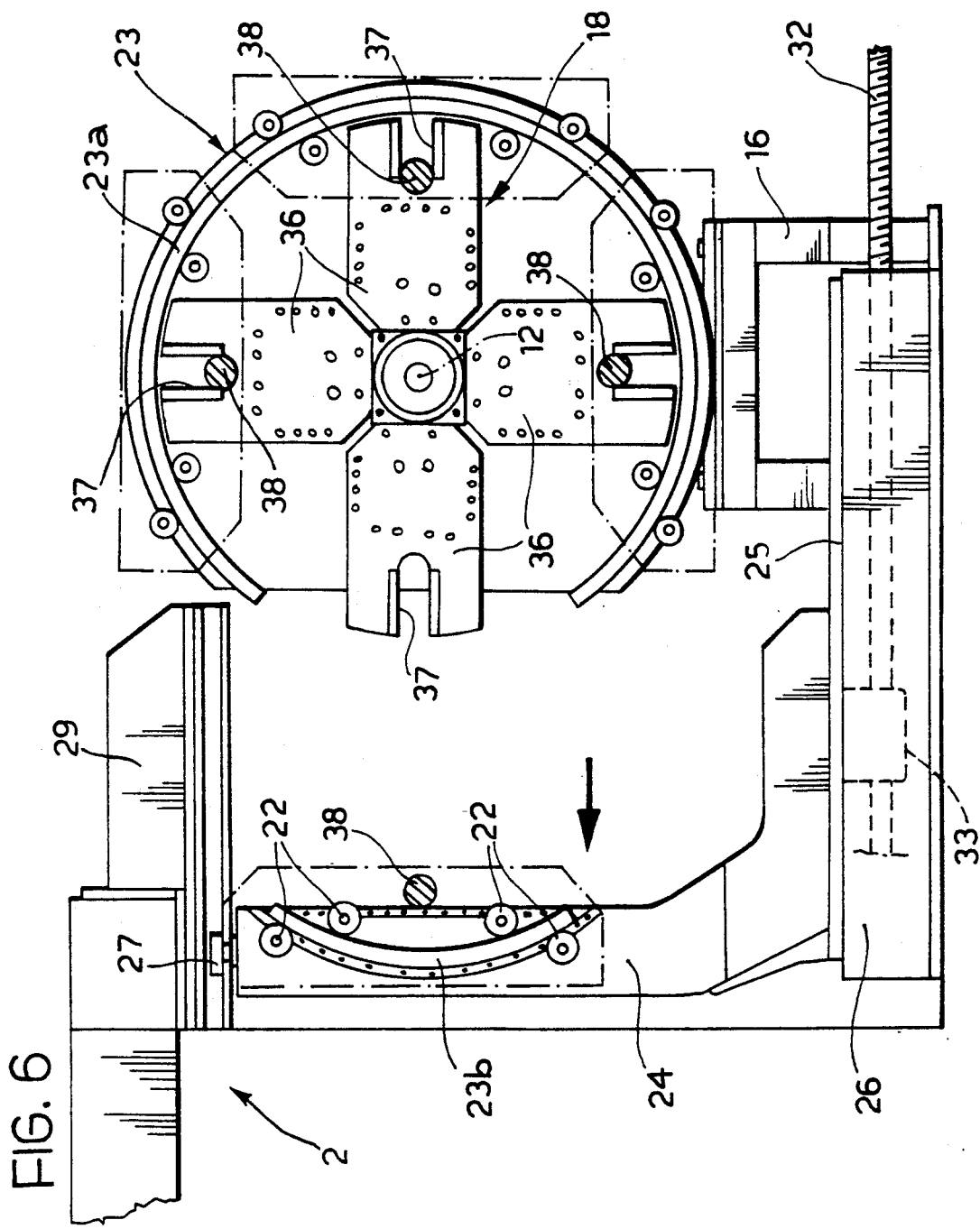

Further characteristics and advantages of the invention will become clear from the description which follows with reference to the appended drawings, provided purely by way of non-limiting example, in which:

FIG. 1 is a schematic perspective view of a welding device according to the invention, FIG. 2 is a section taken on the line II—II of FIG. 1, FIG. 3 is a section taken on the line III—III of FIG. 2, FIG. 4 is an exploded perspective view of a portion of the device of FIG. 1, and FIGS. 5 and 6 show a detail of FIG. 2 in two different operative conditions.

The drawings relate to a station for welding the sides of motor-vehicle bodies. A body side is generally constituted by several pressed sheet-metal elements welded together. In the case of the present invention, each side is preassembled by the loose connection of its components, for example, by the bending of tongues on some components so that they engage the cooperating portions of the other components according to a conventional technique for the assembly of motor-vehicle bodies. The station shown can operate on sides for motor vehicles of various models, as envisaged in the Applicant's Italian patent 1 223 690 and in the corresponding European patent application EP-A-0 351 377 and the corresponding patent U.S. Pat. No. 4,905,884. Naturally, although the appended drawings show a specific case in which the invention is applied to the welding of sides of motor-vehicle bodies, the invention may equally well be applied to other body subassemblies or to entire motor-vehicle bodies.

With reference now to FIGS. 1 and 2 of the appended drawings, a positioning and welding station according to the present invention is generally indicated 1. The station includes a fixed framework 2 which, in the embodiment illustrated, includes two pairs of columns 3 disposed on either side of a conveyor line 4 which transports the sides to be welded. Each pair of columns 3 on the same side of the conveyor line 4 is connected at the top by a longitudinal beam 5. The fixed framework 2 is completed by two cross members 6 which are disposed at the ends of the longitudinal beams 5 and connect the upper ends of the columns 3 on the two sides of the conveyor line 4. The central region within the framework 2 constitutes the working region of the station, in which the sides to be welded stop in order to undergo the necessary welding operations.

In the appended drawings, the conveyor line 4 which is used to transport the loosely preassembled sides to the welding station and to transport the welded sides out of the welding station and to subsequent stations of the production line are shown only schematically.

In the embodiment illustrated, the line 4 includes an overhead conveyor which advances racks 10 along an upper track 9 connected rigidly to the two upper cross members 6 of the framework of the station. Purely by way of example, FIG. 1 also shows a lower track 7 which is connected rigidly to a bed 8 extending longitudinally through the positioning and welding station. The arrows A in FIG. 1 indicate the direction in which the sides advance through the station. The two tracks 7, 9 are used to guide the tops and bottoms of the support racks 10, only one of which is visible in FIGS. 1 and 2. Each rack 10 is constituted essentially by a metal frame with grips 10a (FIG. 2) which support the right-hand and left-hand sides S of a motor-vehicle body. In the present description, the means for moving the racks 10 along the line 4 are not described in detail since they may be of any known type and do not fall within the scope of the present invention. Moreover, the elimination of these details from the drawings makes them more readily and easily understood. Similarly, and for the same reasons, the usual locating and locking means which serve to lock the rack 10 in its correct position when it reaches the working position in the welding station are not shown. In any case, although in the appended drawings a conveyor line is shown schematically by way of example, it is clear that any alternative solution may be used for transporting the preassembled sides into the welding station. Other possible solutions, relating to the welding of entire motor-vehicle bodies are described, for example, in the present Applicant's German patent DE-B-2 810 822. A possible variant has only an overhead conveyor, associated with the upper track 9, and the station has means for stopping the racks 10 precisely in the vertical plane which passes through the track 9.

Again according to the prior art cited above, the welding station has a plurality of pairs of positioning frames which can be interchanged rapidly in the operative position and each of which carries a series of locating devices for correctly positioning the components of the structure for welding. The locating devices of each pair of positioning frames are suitable for a motor vehicle of a specific model. As already envisaged in the prior Italian patent No 1 223 690 and in the corresponding foreign patents, the invention enables the pair of positioning frames which is in the operative position to be replaced rapidly to enable sides for motor vehicles of different models to be welded.

As envisaged in the prior patent cited several times, the various types of positioning frames are arranged on either side of the line 4 on the periphery of a drum 11 which can rotate about an axis 12 parallel to the conveyor line 4. As can be seen in FIG. 2 (for clarity, FIG. 1 does not show all the positioning frames and those shown are shown without their locating devices), four positioning frames 13, corresponding to four different types of sides S, are associated with each drum 11.

Each positioning frame 13 has a plurality of pneumatically-controlled locating and clamping members 14 for engaging a side S when the respective frame 13 is in the operative position adjacent the side (FIG. 2 shows two frames 13 in the operative position and spaced from the respective rotary drums 11) so as to clamp the components of the side in their precise assembly positions before they are welded. Again according to the prior art, each positioning frame 13 also carries electric spot-welding guns 15 (FIGS. 2 and 4). The clamping and welding devices are connected to respective electrical and pneumatic supplies in fixed positions in the working region, by quick coupling means at the moment when a given positioning frame 13 arrives in the operative position, according to a known technique which does not fall within the scope of the present invention. For this reason, the details relating to this connection are not described in the present description or illustrated in the appended drawings.

The structure of each rotary drum 11 and of the respective means for moving the positioning frames 13 will now be described below.

With reference to FIGS. 1 and 4, each rotary drum 11 has two fixed support frames 16 which are spaced apart along the axis 12 (FIG. 2) and include two cylinders 17 the axes of which coincide with the axis 12 and which support two rotors 18 for rotation about that axis. The two rotors 18 are connected by a Cardan transmission shaft 19. One of the two rotors 18 is rotated by a motor-reduction unit 20, by means of a belt transmission 21 (FIG. 1).

With reference to FIGS. 3 and 4, the structure of each positioning frame 13 includes a substantially rectangular, elongate metal frame 13a each end of which carries two pairs of idle rollers 22. With reference also to FIG. 5, the ends of the positioning frames 13 are guided on two annular tracks 23 which are disposed in two parallel planes perpendicular to the axis 12 of the drum 11. Each annular track 23 includes a main fixed sector 23a which is connected rigidly to the fixed support cylinder 17, and an auxiliary movable sector 23b which completes the ring of the track and is movable between a first position (FIG. 5), in which it forms the complete annular track 23 with the sector 23a, and a second position (FIGS. 4 and 6), in which it is spaced from the drum 11 and is adjacent the working region in the welding station. The auxiliary sector 23b is on the side of the annular track 23 which faces the conveyor line 4 in the centre of the welding station. The two auxiliary sectors 23b on either side of the conveyor line are carried by two auxiliary support structures 24 in the form of columns which are movable along a line transverse the conveyor line 4. As can be seen clearly in FIG. 4, each auxiliary support structure 24 has a base which is slidable on a track 25 carried by a fixed bed 26 and its upper end has two idle rollers 27 with vertical axes which engage the sides of respective tracks 28 carried by fixed brackets 29 (FIG. 1) which are cantilevered from the longitudinal beams 5 of the fixed framework 2. The two auxiliary support structures 24 are moved along the line transverse the conveyor line 4 in a synchronised manner by a motor unit 30 (FIG. 1) which rotates two screws 32 (one of which is visible in FIG. 4) by means of two mechanical transmissions 31, each screw 32 engaging a respective female-threaded member 33 connected to the structure 24.

With reference again to FIG. 4, each positioning frame 13 has two lower idle rollers 34 which roll on two fixed support tracks 35 during the transverse movement of the auxiliary structure 24 in order to discharge the substantial weight of the positioning frame to the tracks (see also FIG. 1).

With reference to FIGS. 4, 5 and 6, each rotor 18 of each rotary drum 11 includes four flat spokes 36 the free end of each of which has a recess 37 which opens radially outwardly and houses an idle roller 38 carried by the respective end of each positioning frame 13 (See FIG. 4).

With reference to each side of the welding station, when the auxiliary support structures 24 are in their first positions, shown in FIG. 5, the auxiliary sectors 23b complete the rings of the annular tracks 23. The four positioning frames 13 associated with the rotary drum 11 are guided on the annular tracks 23 since their rollers 22 engage both sides of each annular track 23. Moreover, the pins 38 of the positioning frames are housed and supported in the respective recesses 38 in the rotors 18.

The device described above operates as follows.

Upon the assumption that the welding of two sides S of a body of a first model has just been completed and that the sides S which are now about to enter the station for welding correspond to a body of a different model, the positioning frames 13 which operated on the previous sides are returned to the respective rotary drums 11 by the movement of the auxiliary structures 24 to the positions shown in FIG. 5. As already indicated above, when this position has been reached, the rings of the two fixed tracks 23 are completed and the four positioning frames 13 associated with the drum 11 can be rotated about the axis 12 by the rotation of the two rotors 18. The rotors 18 thus entrain the four positioning frames 13, by means of the pins 38 which are housed in the recesses 37, and cause them to revolve around the axis 12, guided by the engagement of the rollers 22 of the frames 13 on the annular tracks 23. The rotation continues until the positioning frame which corresponds to the new type of structure to be welded is on the side of the ring 23 which faces the conveyor line 4, that is, in correspondence with the auxiliary sectors 23b of the two annular tracks 23. When this position is reached, the rotary movement is stopped and the motor unit 30 is started in order to move the two auxiliary support structures 24 to their operative positions shown in FIG. 6. As they move, the two structures 24 entrain the two auxiliary sectors 23b of the annular tracks 23 and the positioning frame 13 associated therewith. During this movement, the bottom of the frame bears on the tracks 35 by means of the rollers 34 (FIG. 4). Once the position shown in FIG. 6 has been reached, the clamping and welding devices on the positioning frame are connected to their electrical and pneumatic supplies, after which the clamping devices can engage the respective side in order to clamp its components in the correct assembly positions. At this point, the welding guns are operated in order to execute enough spot welds to stabilise the geometry of the side. Upon completion of the welding, the clamping devices are opened and remain ready to receive a new structure which enters the welding station to be welded. If this structure corresponds to bodywork for a different model, the steps described above are repeated in order to bring the two positioning frames corresponding to the new body type into the operative positions.

Naturally, the principle of the invention remaining the same, the details of construction and forms of embodiment may be varied widely with respect to those described and illustrated purely by way of example, without thereby departing from the scope of the present invention.

What is claimed is:

1. A device for welding structures constituted by loosely preassembled, pressed sheet-metal elements, particularly but not exclusively motor-vehicle bodies and parts thereof, the device including:

a station for positioning and welding the components of the structure, a conveyor line for transporting the loosely preassembled structures to the station, at least two pairs of positioning frames disposed in the station on either side of the conveyor line, each pair of positioning frames having locating devices which can engage the structure to be welded and are suitable for the specific geometric shape of a structure of a particular type, welding means in said station for welding the elements of the structure after they have been positioned correctly by the respective pair of positioning frames, means for transporting the positioning frames in order to bring the pair of positioning frames corresponding to the type of structure to be welded at the time in question into an operative position in the welding station, said transporting means including:

two rotary drums which are disposed in the station on either side of the conveyor line and are rotatable about respective axes parallel to the conveyor line, each drum being associated with the positioning frames on one side of the station, means for restraining respective positioning frames in fixed positions on each drum during its rotation, and means for completely removing one positioning frame from the respective rotary drum when the drum is stationary and for moving the frame transverse the conveyor line towards an operative position adjacent the structure to be welded and, in the opposite direction, from its operative position to return the positioning frame to the respective rotary drum, wherein:

the means for restraining the respective positioning frames on each rotary drum include a pair of annular tracks disposed in two parallel planes perpendicular to the axis of rotation of the drum, the ends of each positioning frame are guided on the annular tracks, each rotary drum includes a motor-driven shaft, two rotors connected to the shaft, and means on each rotor for entraining the positioning frames in rotation about the axis of the drum, guided on the two annular tracks, each annular track has a fixed, main sector which is connected rigidly to a fixed support structure and an auxiliary sector which completes the ring of the track and is separate from the main sector on the side of the ring which faces the conveyor line, and the means for transporting the positioning frames include, for each side of the station, two auxiliary support structures to which the two auxiliary sectors of the annular tracks are connected rigidly and which are movable transverse the conveyor line.

2. A device according to claim 1, wherein each rotor has a plurality of spokes with recesses which open radially outwardly and each positioning frame carries a member engageable in a respective said recess at one end.

3. A device according to claim 2, wherein each end of each positioning frame has at least one pair of idle rollers for engaging the radially outer side and the radially inner side of the respective annular track, respectively.

4. A device according to claim 3, wherein each positioning frame has support rollers for rolling on fixed support tracks during the transverse movement of the auxiliary support structures.

5. A device according to claim 1, wherein the conveyor line includes the racks and means for guiding said racks, each rack having means for supporting a right-hand side and a left-hand side of a motor-vehicle body on its two faces.

* * * * *